United States Patent [19]
Roberts

[11] Patent Number: 5,401,971
[45] Date of Patent: Mar. 28, 1995

[54] OVERCOATED RADIATION IMAGE STORAGE PANEL AND METHOD FOR PREPARING RADIATION IMAGE STORAGE PANEL

[75] Inventor: Luther C. Roberts, Rochester, N.Y.

[73] Assignee: Eastman Kodak Company, Rochester, N.Y.

[21] Appl. No.: 157,581

[22] Filed: Nov. 24, 1993

[51] Int. Cl.$^6$ .............................................. G21K 4/00
[52] U.S. Cl. .................. 250/484.4; 250/483.1
[58] Field of Search ............... 250/484.4, 484.3, 484.2, 250/483.1; 378/185

[56] References Cited

U.S. PATENT DOCUMENTS

| | | |
|---|---|---|
| 2,502,529 | 4/1950 | Murray . |
| 2,887,379 | 5/1959 | Blake et al. . |
| 3,300,310 | 1/1967 | Kennard et al. . |
| 3,300,311 | 1/1967 | Kennard et al. . |
| 3,617,285 | 11/1971 | Staudenmayer . |
| 3,743,833 | 7/1973 | Martic et al. . |
| 4,059,768 | 11/1977 | Van Landeghem et al. . |
| 4,360,571 | 11/1982 | Rabatin . |
| 4,374,905 | 2/1983 | Rabatin . |
| 4,380,702 | 4/1983 | Takahashi et al. . |
| 4,491,620 | 1/1985 | Joiner, Jr. . |
| 4,491,736 | 1/1985 | Teraoka . |
| 4,505,989 | 3/1985 | Umemoto et al. . |
| 4,666,774 | 5/1987 | Christini . |
| 4,822,696 | 4/1989 | Lammers et al. . |
| 4,851,323 | 7/1989 | Maeda ................................. 428/421 |
| 4,912,333 | 3/1990 | Roberts et al. . |
| 5,108,836 | 4/1992 | Ocampo et al. ...................... 428/335 |
| 5,192,635 | 3/1993 | Inukai et al. ......................... 430/108 |
| 5,227,253 | 7/1993 | Takasu et al. ........................ 428/690 |

FOREIGN PATENT DOCUMENTS

| | | |
|---|---|---|
| 0234385B1 | 9/1991 | European Pat. Off. . |
| 579016A1 | 1/1994 | European Pat. Off. . |
| 2193100-A | 6/1981 | Japan . |
| 3135798-A | 10/1989 | Japan . |
| 4002998-A | 1/1992 | Japan . |
| 2017140 | 10/1979 | United Kingdom . |

OTHER PUBLICATIONS

D. R. Paul et al, "Polymer Blends", Concise Encyclopedia of Polymer Science & Engineering, 1990, pp. 830–835.
Research Disclosure, vol. 154, Feb., 1977, item 15444.
Research Disclosure, Dec. 1978, Item 17643, Section XVII.
Research Disclosure, vol. 184, Aug. 1979, item 18431, Section I.

Primary Examiner—Paul M. Dzierzynski
Assistant Examiner—Richard Hanig
Attorney, Agent, or Firm—Robert Luke Walker

[57] ABSTRACT

A radiographic phosphor panel which has a support, a luminescent layer overlaying the support, and an overcoat layer overlaying the luminescent layer. The luminescent layer includes phosphor crystals. The overcoat layer is a miscible blend of poly(vinylidene fluoride-co-tetrafluoroethylene) and poly((1 to 2 carbon alkyl)methacrylate).

19 Claims, No Drawings

OVERCOATED RADIATION IMAGE STORAGE PANEL AND METHOD FOR PREPARING RADIATION IMAGE STORAGE PANEL

FIELD OF THE INVENTION

The invention relates to radiation image storage panels and methods for preparing radiation image storage panels. The invention more particularly relates to a radiation image storage panel having an overcoat layer of a miscible blend of vinylidene fluoride-tetrafluoroethylene copolymer and poly((methyl or ethyl)methacrylate).

BACKGROUND OF THE INVENTION

A radiographic phosphor panel contain a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Radiographic storage panels have a support, a luminescent layer which includes the radiographic phosphor, and, generally, an overcoat layer to protect the phosphor layer. An overcoat layer is, desirably, substantially clear and transparent to the light emitted by the x-ray phosphor. To the extent that the overcoat absorbs any of the light emitted by the luminescent layer, the light output from the screen will be diminished, resulting in the need for increased x-ray exposure. An overcoat which is hazy, scattering the light used to stimulate the phosphor layer, can lead to a spreading-out of the stimulating light and a blurring of the image of fine objects, such as, cracks in bone or narrow blood vessels and an observed unsharpness and loss of diagnostic information.

An overcoat layer helps protect the phosphor layer underneath from mechanical damage due to scratches and abrasion, which would otherwise result in surface defects leading to artifacts in radiographs produced. In addition, an overcoat for all but the most moisture-resistant phosphors, must provide a barrier to the penetration of moisture, in the form of water vapor or liquid water, which would degrade the performance of the phosphor. Moisture penetration commonly has the effect of causing the panel to either have reduced light output, requiring the use of an increased x-ray dose to produce the same radiographic film density, or causing more localized dimmer areas as artifacts in resulting radiographs.

Degradation of final images due to phosphor panel discoloration is a particularly serious concern for radiation image storage panels, since unlike intensifying screens, storage panels are subject to cumulative degradative losses of both emitted light and stimulating radiation. There has not been agreement as to the mechanism of phosphor panel discoloration, but water and molecular iodine may both be involved.

What was noticed early was that intensifying panels subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40–59 and U.S. Pat. No. 4,360,571, column 1, lines 46–64). Great Britain Patent Application No. GB 2 017 140 A states:

"[I]t has been discovered that screens containing lanthanum[or gadolinium]-oxy-halide phosphors tend to discolor rapidly when in use and in particular when held in contact with an X-ray film, . . .

"In spite of intensive research into this discolouration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.

"Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film." (page 1, lines 14–33)

Yellowing of a phosphor layer of a radiation image storage phosphor panel, in which the phosphor contains iodine, is described in European Patent Specification No. EP 0 234 385 B1. The yellowing is ascribed to liberation of free iodine. A approach which has been taken to reduce storage panel yellowing is the incorporation of a stabilizer within one or more layers of the panel. European Patent Specification No. EP 0 234 385 B1 discloses as stabilizers a compound containing a free epoxy group and/or a compound selected from: phosphites, organotin compounds, and metal salts of particular organic acids.

Among materials which provide good moisture barrier properties are polymers having chlorine or fluorine containing monomer units, such as poly(vinylidene fluoride) and its copolymers. These materials, when used as x-ray panel overcoat layers, however, have the shortcoming of poor resistance to abrasion or scratches. In addition, many of these polymers form hazy films when solvent-cast.

Acrylic polymers, such as poly(methylmethacrylate) and poly(ethylmethacrylate) are very resistant to scratches and abrasion when used as overcoats for phosphor panels, and provide very clear solvent-cast layers. The moisture properties of such overcoat layers are, however, only fair. Overcoat layers have not proven particularly useful for preventing panel discoloration or yellowing associated with iodine.

Miscible blends of poly(methylmethacrylate) and vinylidene fluoride-tetrafluoroethylene copolymer (PMMA-PVF$_2$) and of poly(ethylmethacrylate) and vinylidene fluoride-tetrafluoroethylene copolymer (PEMA-PVF$_2$) are described in Paul, D. R., et al, "Polymer Blends", *Concise Encyclopedia of Polymer Science and Engineering*, Jacqueline I. Kroschwitz, Exec. Editor, John Wiley & Sons, New York, (1990), pp. 830–835. PMMA-PVF$_2$ and PEMA-PVF$_2$ are both indicated to be commercially available. PMMA-PVF$_2$ is described as having an application as outdoor film and having the advantages of better chemical and UV resistance than PMMA and better clarity than PVF$_2$. PEMA-PVF$_2$ is described as having an application as decorative stripes on automobiles and having the advantages of good weatherability, clarity, and chemical resistance.

It would be desirable to provide improved overcoated radiation image storage panels, and their preparation methods, in which panel yellowing is reduced.

SUMMARY OF THE INVENTION

The invention, in its broader aspects, provides a radiographic phosphor panel which has a support, a luminescent layer overlaying the support, and an overcoat layer overlaying the luminescent layer. The luminescent layer includes phosphor crystals. The overcoat layer is a miscible blend of poly(vinylidene fluoride-co-tetrafluoroethylene) and poly((1 to 2 carbon alkyl)methacrylate).

It is an advantageous effect of at least some of the embodiments of the invention that improved overcoated radiation image storage panels, and their preparation methods, are provided in which panel yellowing is reduced.

DESCRIPTION OF PARTICULAR EMBODIMENTS

The overcoated radiation image storage panel of the invention comprises a support, a luminescent layer which includes storage phosphor crystals and an overcoat layer. The overcoat may extend over and seal the edges of the phosphor layer.

The overcoat layer is a miscible blend of poly(vinylidene fluoride-co-tetrafluoroethylene) and poly((1 to 2 carbon alkyl)methacrylate). In a preferred embodiment of the invention, the overcoat layer is a blend of poly(vinylidene fluoride-co-tetrafluoroethylene) and poly(methylmethacrylate) in a ratio by weight of PVF$_2$:PMMA of from 70:30 to 10:90. A more preferred range is from 70:30 to 50:50. It has been determined that, within these ranges the overcoat layer provides a desirable combination of hardness and imperviousness to moisture and the like.

In a particular embodiment of the invention, the vinylidene fluoride-tetrafluoroethylene copolymer used was Kynar 7201 marketed by Elf Atochem North America of Philadelphia, Pa. Kynar 7201 has a molecular weight of 244,000, a melting point of 122°–126° C., and a specific gravity of 1.88 at 23° C. In that embodiment, the PMMA used was Elvacite 2051, which is marketed by DuPont Company of Wilmington, Del. and has an inherent viscosity at 20° C. of 1.25.

The phosphor in the storage panel can be any radiographic phosphor, however, an advantage provided by the invention is substantial isolation from ambient atmosphere. This is particularly advantageous for stabilization against discoloration associated with iodine containing phosphors. In storage phosphors, this would include, for example, alkaline earth metal fluorohalide storage phosphors containing iodine and alkali metal halide storage phosphors containing iodine. A mixture of phosphors, at least one of which contains iodide, could also be used, if desired, to form an panel having optimal properties for a particular application. Panel constructions containing more than one phosphor-containing layer are also possible, with iodine containing phosphors being present in one or more of the phosphor-containing layers.

In particular embodiments of the invention, the phosphor is the product of firing starting materials comprising optional oxide and a combination of species characterized by the relationship:

$$MFX_{1-z}I_z \cdot uM^aX^a : yA : tD$$

where M is selected from Mg, Ca, Sr, and Ba; X is selected from Cl and Br; $M^a$ is selected from Na, K, Rb, and Cs; $X^a$ is selected from Cl, Br, and I; A is selected from Eu, Ce, Sm, and Tb; and D is selected from V, Cr, Mn, Fe, Co, and Ni. Numbers are represented by the following: z is from $1 \times 10^{-4}$ to 1, u is from 0 to 1, y is from $1 \times 10^{-4}$ to 0.1, and t is from 0 to $10^{-2}$. The same designations appearing elsewhere herein have the same meanings unless specifically stated to the contrary. Groups of materials, for example the materials defined by M, are to be understood as inclusive of combinations of materials in that group.

In some of those embodiments of the invention, the inventive storage panel includes a divalent alkaline earth metal fluorohalide phosphor containing iodine which is the product of firing an intermediate, comprising oxide and a combination of species characterized by the relationship:

$$(Ba_{1-a-b-c}Mg_aCa_bSr_c)FX_{1-z}I_z \cdot rM^aX^a : yA$$

where X, $M^a$, $X^a$, A, z, and y have the same meanings as in formula (1) and the sum of a, b, and c is from 0 to 0.4, and r is from $10^{-6}$ to 0.1. In a particular embodiment of the invention, $M^a$ is potassium and the storage phosphor is further characterized as disclosed in a U.S. Patent Application filed concurrently with this application, by Joseph F. Bringley, Philip S. Bryan and Andrea M. Hyde, entitled: ALKALINE EARTH METAL FLUOROBROMOIODIDE STORAGE PHOSPHOR AND RADIATION IMAGE STORAGE PANEL, the disclosure of which is hereby incorporated herein by reference.

It is preferred that the phosphor be a storage phosphor produced utilizing an oxosulfur reducing agent containing phosphor intermediate, disclosed in a U.S. Patent Application filed concurrently with this application, by Joseph F. Bringley, Philip S. Bryan and Andrea M. Hyde, entitled: STABILIZED PHOSPHOR INTERMEDIATES, STORAGE PHOSPHORS, RADIATION IMAGE STORAGE PANELS, AND PREPARATION METHODS; (hereafter referred to as "Stabilized Phosphor Intermediates Application), the disclosure of which is hereby incorporated herein by reference. The stabilized phosphor intermediate disclosed therein and its resulting phosphor have increased photostimulated luminescence in comparison to unstabilized controls.

Further protection against yellowing, particularly in the event of mechanical damage to the overcoat layer, can be provided by using a storage panel produced in accordance with a U.S. Patent Application filed concurrently with this application, by Joseph F. Bringley, Andrea M. Hyde, Philip S. Bryan, Barbara Fisher, and Luther C. Roberts, entitled: PIGMENT STABILIZED RADIATION IMAGE STORAGE PANEL AND METHOD FOR PREPARING RADIATION IMAGE STORAGE PANEL, the disclosure of which is hereby incorporated herein by reference; or a U.S. Patent Application filed concurrently with this application, by Joseph F. Bringley, Andrea M. Hyde, Philip S. Bryan, Barbara Fisher, and Luther C. Roberts, entitled: RADIOGRAPHIC PHOSPHOR PANEL HAVING BINDER COMPATIBLE OXOSULFUR STABILIZER AND METHOD FOR PREPARING PHOSPHOR PANEL, the disclosure of which is also hereby incorporated herein by reference. The phosphor panels disclosed therein have oxosulfur reducing agent dispersed in a layer of the panel to stabilize against yellowing.

The luminescent layer of the storage panel of the invention contains a polymeric binder to give it structural coherence. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc. The binder used for the luminescent layer can be the same as the material in the overcoat layer.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. It is preferable, however, to include a dye or pigment which absorbs some of the stimulating radiation, generally provided by a laser; but mostly reflects emitted light. U.S. Pat. No. 4,491,736 to Teraoka teaches the use of such materials in storage panel.

Apart from the phosphor layers, the overcoat layer, and assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders or the same material as in the overcoat layer.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in *Research Disclosure*, Vol. 184, August 1979, Item 18431, hereby incorporated herein by reference.

The radiographic panels of the invention are formed by conventional coating techniques. Phosphor powder and other addenda are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel. The overcoat layer is then applied from solvent in the same manner as the luminescent layer.

In preparing the overcoat layer, the PVF$_2$ and PMMA may be dissolved separately or together in a solvent for both materials such as 2-butanone. A solution of 5–20 weight percent total solids is generally suitable. The overcoat layer solution may be applied in a conventional manner, for example, by knife-coating at 10° C.

The description herein is directed to a storage phosphor panel, however, the invention is not limited to a storage panel; but is also inclusive of prompt emission panels incorporating the same overcoat layer.

The following Examples and Comparative Examples are presented to further illustrate and elucidate some preferred modes of practice of the invention. Unless otherwise indicated, all starting materials were commercially obtained.

The X-ray storage phosphors used to prepare coatings were prepared by the following procedure.
Preparation of BAFBr$_{0.80}$I$_{0.20}$:0.001Eu$^{2+}$.

In a 2000 ml beaker containing a Teflon coated magnetic stir bar, 269.54 grams of BaBr$_2$.2H$_2$O and 62.22 grams of BaI$_2$.2H$_2$O were dissolved in a 2- to 3-fold excess of distilled water. The solution was then filtered. To the filtered solution was added 2.88 grams of fumed silica and 0.500 g of BaS$_2$O$_3$.H$_2$O followed by 0.176 grams of KBr. 167.5 grams of BaF$_2$ containing 0.002 moles of EuF$_2$ and 0.01 mol CaF$_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840°–860° C. for 3.5 hours under flowing nitrogen. The phosphor powder after being allowed to cool under nitrogen, was then ground and sieved through a 38 micron screen yielding the finished phosphor.
Preparation of Image Storage Panels:

Image storage panels were prepared by the following general procedure. Phosphor and oxosulfur reducing pigment, if any, were dispersed in a 13% (weight/weight) solution of PERMUTHANE ™ U-6366 polyurethane marketed by ICI Polyurethanes Group of West Deptford, N.J. in 93:7 (weight/weight) dichloromethane/methanol solvent. The dispersions were often milled 30 minutes with zirconium oxide beads on a paint shaker. The phosphor to binder ratio was about 15:1. Knife-coatings were prepared on a polyethylene terephthalate support. The knife-coatings were allowed to air-dry to produce luminescent layers. After drying, except where noted, the completed storage panels were knife-coated with overcoat layer solution prepared as follows. Solutions of the weight/weight ratios indicated below were prepared by mixing each polymer in 2-butanone separately and then agitating until complete dissolution was achieved followed by combining the two solutions.

The relative photostimulated luminescence (PSL) intensities of the image storage panels were measured by cutting 2.6 centimeter diameter disks from the panels, and simultaneously exposing the sample and a standard to filtered X-radiation. The X-ray source was a tungsten target tube operating at 70 kVp and 3.0 mA. The filtration consisted of a 3.5 centimeter thickness of aluminum. After exposure to X-rays, the samples and standard were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses were determined initially and after 26 days at 90° F. and 90 percent relative humidity. The percentage of PSL retained relative to the initial PSL appear in Table 1. The measured PSL responses were corrected for variations in phosphor coverage by dividing by the coverage value determined for that particular disk.

EXAMPLES 1–3 AND COMPARATIVE EXAMPLES 1–2

Image storage panels were prepared from BaFBr$_{0.80}$I$_{0.20}$:0.001Eu$^{2+}$ storage phosphor as above described. PVF$_2$/PMMA blend overcoat layers were prepared with the blend ratios and thicknesses indicated in Table 1. PSL results were determined as discussed above and are presented in Table 1 along with relative stability values, normalized to a nominal thickness of 1.

EXAMPLES 4–12 AND COMPARATIVE EXAMPLES 3–4

Overcoat layer solutions were prepared in the same manner as in Example 1 and were knife-coated onto tempered metal blocks at 10° C. Each overcoat layer was scratched with a finger nail and various hardnesses of pencil. Results are presented in Table 2.

EXAMPLE 13

An overcoat layer was prepared in the same manner as Examples 4–12, with the exception that poly(ethylmethacrylate) was substituted for poly(methylmethacrylate). The overcoat layer was clear and did not scratch with a finger nail.

COMPARATIVE EXAMPLE 5

Attempts were made to prepare overcoat layers using vinylidene fluoride-hexa fluoropropylene copolymer instead of vinylidene fluoride-tetrafluoroethylene copolymer in the same manner as in Example 1. Overcoat layers prepared were cloudy.

EXAMPLE 14

An overcoat layer was prepared in the same manner as in Examples 4–12, with poly(methyl methacrylate) and with a 50/50 blend of vinylidene fluoride-co-tetrafluoroethylene copolymer and poly(methyl methacrylate). The blended polymer overcoat gave less curl than the poly(methyl methacrylate) alone.

TABLE 1

| Example or Comparative Example | Blend Ratio PVF$_2$ to PMMA | Overcoat Thickness | PSL % of Initial | Relative Stability |
|---|---|---|---|---|
| Comparative Example 1 | 100/0 | 6.0 | 39 | 6.5 |
| Example 1 | 70/30 | 8.8 | 39 | 4.4 |
| Example 2 | 60/40 | 7.6 | 42 | 5.5 |
| Example 3 | 50/50 | 8.4 | 20 | 2.4 |
| Comparative Example 2 | 0/100 | 8.4 | 8 | 0.9 |

TABLE 2

| Example or Comp. Example | Blend Ratio PVF$_2$ to PMMA | Visible Marks Nail | Visible Marks HB | Visible Marks 2H | Visible Marks 3H |
|---|---|---|---|---|---|
| Com Ex 3 | 100/0 | Yes | Yes | Yes | Yes |
| Ex 4 | 90/10 | Yes | Yes | Yes | Yes |
| Ex 5 | 80/20 | No | Yes | Yes | Yes |
| Ex 6 | 70/30 | No | No | Yes | Yes |
| Ex 7 | 60/40 | No | No | No | Yes |
| Ex 8 | 50/50 | No | No | No | No |
| Ex 9 | 40/60 | No | No | No | No |
| Ex 10 | 30/70 | No | No | No | No |
| Ex 11 | 20/80 | No | No | No | No |
| Ex 12 | 10/90 | No | No | No | No |
| Com Ex 4 | 0/100 | No | No | No | No |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic phosphor panel comprising a support, a luminescent layer overlaying said support, and an overcoat layer overlaying said luminescent layer, said luminescent layer including phosphor crystals, said luminescent layer being subject to iodine-associated yellowing, said overcoat layer being a miscible blend of poly(vinylidene fluoride-co-tetrafluoroethylene) and second polymer selected from the group consisting of poly(methylmethacrylate) and poly(ethylmethacrylate), said poly(vinylidene fluoride-co-tetrafluoroethylene) and said second polymer having a ratio in parts by weight of from 70:30 to 10:90.

2. The radiographic phosphor panel of claim 1 wherein said overcoat layer is a miscible blend of poly(vinylidene fluoride-co-tetrafluoroethylene) and poly(methylmethacrylate).

3. The radiographic phosphor panel of claim 1 wherein said overcoat layer is a miscible blend of poly(vinylidene fluoride-co-tetrafluoroethylene) and poly(methylmethacrylate) in a ratio by weight of from 70:30 to 10:90.

4. The radiographic phosphor panel of claim 1 wherein said overcoat layer is a miscible blend of poly(vinylidene fluoride-cotetrafluoroethylene) and poly(methylmethacrylate) in a ratio by weight of from 70:30 to 50:50.

5. The radiographic phosphor panel of claim wherein said phosphor is selected from the group consisting of divalent alkaline earth metal fluorohalide phosphors containing iodine and alkali metal halide phosphors containing iodine.

6. The radiographic phosphor panel of claim 1 wherein said phosphor consisting essentially of the product of firing a combination of species characterized by the relationship:

$$MFX_{1-z}I_z \cdot uM^aX^a \cdot yA \cdot tD$$

wherein
M is selected from Mg, Ca, Sr, and Ba;
X is selected from Cl and Br;
$M^a$ is selected from Na, K, Rb, and Cs;
$X^a$ is selected from F, Cl, Br, and I;
A is selected from Eu, Ce, Sm, and Tb;
D is selected from V, Cr, Mn, Fe, Co, and Ni;
z is from $1 \times 10^{-4}$ to 1;
u is from 0 to 1;
y is from $1 \times 10^{-4}$ to 0.1; and
t is from 0 to $10^{-2}$;
oxide; and
oxosulfur reducing agent for iodine, said oxosulfur reducing agent being selected from the group consisting of inorganic and organic salts having anions having the general formula $S_jO_k$ wherein $0.25 < j/k < 1.0$, and Bunte compounds, said oxosulfur reducing agent being present prior to firing in a molar ratio of sulfur to alkaline earth metal of from $1 \times 10^{-4}$ to 0.020.

7. The radiographic phosphor panel of claim 6 wherein said phosphor consists essentially of the product of firing a combination of species characterized by the relationship:

$$(Ba_{1-a-b-b}Mg_aCa_bSr_c)FX_{1-z}I_z \cdot rM^aX^a \cdot yA$$

wherein
X is selected from Cl and Br;
$M^a$ is selected from Na, K, Rb, and Cs;
$X^a$ is selected from F, Cl, Br, and I;
A is selected from Eu, Ce, Sm, and Tb;
a+b+c is from 0 to 0.4;
z is from $1 \times 10^{-4}$ to 1;
r is from $10^{-6}$ to 0.1;
y is from $1 \times 10^{-4}$ to 0.1;
oxide; and
said oxosulfur reducing agent.

8. The radiographic phosphor panel of claim 1 wherein said support is substantially rigid.

9. The radiographic phosphor panel of claim 1 wherein said poly(vinylidene fluoride-co-tetrafluoroethylene) and said second polymer have a ratio in parts by weight of from 70:30 to 50:50.

10. The storage panel of claim 1 wherein said poly(vinylidene fluoride-co-tetrafluoroethylene) and said second polymer have relative concentrations that render said storage panel less subject to curl than an equivalent storage panel having a poly(methyl methacrylate) overcoat layer.

11. A storage phosphor panel comprising, in order: a support; a fluorescent layer including phosphor crystals capable of absorbing X-radiation and emitting longer wavelength electromagnetic radiation in response to stimulating radiation of a third wavelength, said phosphor including iodine and other halogen, said fluorescent layer being subject to yellowing upon exposure to ambient atmosphere; and an overcoat layer, said overcoat layer being a miscible blend of poly(vinylidene fluoride-co-tetrafluoroethylene) and a second polymer selected from the group consisting of poly(methylmethacrylate) and poly(ethylmethacrylate), said poly(vinylidene fluoride-co-tetrafluoroethylene) and said second polymer having a ratio in parts by weight of from 70:30 to 10:90.

12. The storage panel of claim 11 wherein said overcoat layer is a miscible blend of poly(vinylidene fluoride-co-tetrafluoroethylene) and poly(methylmethacrylate).

13. The storage panel of claim 11 wherein said overcoat layer is a miscible blend of poly(vinylidene fluoride-co-tetrafluoroethylene) and poly(methylmethacrylate) in a ratio by weight of from 70:30 to 10:90.

14. The storage panel of claim 11 wherein said overcoat layer is a miscible blend of poly(vinylidene fluoride-co-tetrafluoroethylene) and poly(methylmethacrylate) in a ratio by weight of from 70:30 to 50:50.

15. The storage panel of claim 14 wherein said phosphor is selected from the group consisting of divalent alkaline earth metal fluorohalide phosphors containing iodine and alkali metal halide phosphors containing iodine.

16. The storage panel of claim 11 wherein said poly(vinylidene fluoride-co-tetrafluoroethylene) and said second polymer have a ratio in parts by weight of from 70:30 to 50:50.

17. The storage panel of claim 11 wherein said poly(vinylidene fluoride-co-tetrafluoroethylene) and said second polymer have relative concentrations that render said storage panel less subject to curl than an equivalent storage panel having a poly(methyl methacrylate) overcoat layer.

18. A method for preparing a radiographic phosphor panel comprising forming a luminescent layer on a support, making a solution of poly(vinylidene fluoride-co-tetrafluoroethylene) and a second polymer selected from the group consisting of poly(methylmethacrylate) and poly(ethylmethacrylate), and said poly(vinylidene fluoride-co-tetrafluoroethylene) said second polymer having a ratio in parts by weight of from 70:30 to 10:90, and coating said solution over said luminescent layer.

19. The method of claim 18 wherein said solution is in 2-butanone.

* * * * *